United States Patent
Pierini et al.

(10) Patent No.: US 8,973,853 B2
(45) Date of Patent: Mar. 10, 2015

(54) PROCESS FOR DRY-GRINDING A POLYSACCHARIDE DERIVATIVE

(75) Inventors: Peter E. Pierini, Lake Jackson, TX (US); Yvonne M. Goerlach-Doht, Rosengarten (DE); Juergen Hermanns, Nottensdorf (DE)

(73) Assignee: Dow Global Technologies LLC, Midland, MI (US)

( * ) Notice: Subject to any disclaimer, the term of this patent is extended or adjusted under 35 U.S.C. 154(b) by 117 days.

(21) Appl. No.: 13/498,621

(22) PCT Filed: Jul. 28, 2010

(86) PCT No.: PCT/US2010/043522
§ 371 (c)(1),
(2), (4) Date: Mar. 28, 2012

(87) PCT Pub. No.: WO2012/015400
PCT Pub. Date: Feb. 2, 2012

(65) Prior Publication Data
US 2013/0112787 A1    May 9, 2013

(51) Int. Cl.
| | |
|---|---|
| *B02C 11/08* | (2006.01) |
| *B02C 21/00* | (2006.01) |
| *B02C 19/18* | (2006.01) |
| *C08J 3/12* | (2006.01) |
| *C08L 1/28* | (2006.01) |
| *B02C 23/24* | (2006.01) |

(52) U.S. Cl.
CPC .................. *B02C 19/186* (2013.01); *C08J 3/12* (2013.01); *C08L 1/284* (2013.01); *B02C 23/24* (2013.01); *C08J 2305/00* (2013.01)
USPC .............................................. 241/23; 241/30

(58) Field of Classification Search
USPC ...................................................... 241/23, 30
See application file for complete search history.

(56) References Cited

U.S. PATENT DOCUMENTS

| | | | |
|---|---|---|---|
| 2,331,864 A | 10/1943 | Swinehart et al. | |
| 4,979,681 A | 12/1990 | Donges et al. | |
| 6,320,043 B1 | 11/2001 | Weber et al. | |
| 6,509,461 B2 | 1/2003 | Schlesiger et al. | |
| 2001/0025101 A1 | 9/2001 | Schlesiger et al. | |

FOREIGN PATENT DOCUMENTS

| | | |
|---|---|---|
| DE | 952264 C | 11/1956 |
| EP | 0201895 A2 | 11/1986 |
| EP | 0824107 A2 | 2/1998 |
| EP | 1792930 A1 | 6/2007 |
| GB | 2262527 A | 6/1993 |
| WO | 96/00748 | 1/1996 |

OTHER PUBLICATIONS

Ullmann's Encyclopedia of Industrial Chemistry, Fifth Completely Revised Edition, vol. A5, 1986, p. 1-29.
Witt, et al., Direct Imaging of Very Fast Particles Opens the Application of the Powerful (Dry) Dispersion for Size and Shape Characterization, Sympatec GmbH, 2004, p. 1-4.

*Primary Examiner* — Faye Francis

(57) ABSTRACT

In a process for producing a particulate polysaccharide derivative by dry-grinding a moist polysaccharide derivative, one or more of the properties selected from median diameter, median length, bulk density and dissolution rate is controlled by controlling the temperature of the polysaccharide derivative prior to dry-grinding. Advantageously one or more of the properties selected from median diameter, median length, bulk density and dissolution rate of the particles after dry-grinding is adjusted to a first value by a first temperature of the polysaccharide derivative prior to dry-grinding and is adjusted to a second value by a second temperature.

16 Claims, No Drawings

PROCESS FOR DRY-GRINDING A POLYSACCHARIDE DERIVATIVE

This invention relates to a process for dry-grinding polysaccharide derivatives, particularly cellulose derivatives.

BACKGROUND OF THE INVENTION

Polysaccharide derivatives are typically produced as a reactor product in a form which is friable or lumpy or may resemble cotton wool. The reactor product is typically purified by washing. In this form, the wet polysaccharide derivatives still retain residual structures determined by the raw materials. Thus, for example, cellulose ethers can still exhibit the fibrous structure of the initial cellulose. These polysaccharide derivatives are generally unsuitable for use, for example, as products soluble in organic and/or aqueous media. In principle, virtually all polysaccharide derivatives have therefore to be ground and dried in order to be made suitable for use.

The cellulose derivatives rank among the industrially important polysaccharide derivatives. Their preparation, properties and applications are described, for example, in Ullmann's Encyclopedia of Industrial Chemistry, 5th Edition, (1986), Volume A5, pages 461-488, VCH Verlagsgesellschaft, Weinheim or in "Methoden der organischen Chemie" (methods of organic chemistry), 4th Edition (1987), Volume E20, Makromolekulare Stoffe, Part Volume 3, pages 2048-2076, Georg Thieme Verlag, Stuttgart.

EP-B 0 370 447 (equivalent to U.S. Pat. No. 4,979,681) describes a process for the non-destructive grinding and simultaneous drying of moist cellulose ethers, wherein a cellulose ether having an initial moisture content of 20 to 70 wt. % is conveyed by means of a transport gas and simultaneously comminuted by impact and friction and, by means of the energy of grinding, is dried to a residual moisture content of 1 to 10 wt. %.

WO 96/00748 discloses a process for comminuting cellulose ethers which involves the extrusion of a hydrated cellulose ether through orifices having a cross-sectional area of from 0.0075 mm$^2$ to 1 mm$^2$ (7.5×10$^{-9}$ m$^2$ to 1×10$^{-6}$ m$^2$) and cutting up the extrudate thus produced to the desired length.

These prior art processes are mostly multistep with a pre-dryer or preliminary embrittlement or preliminary compaction. Furthermore, in all processes the chemical and/or thermal action on the macromolecules, particularly during the processing of highly viscous, highly substituted products, is invariably so high that during the grinding process the macromolecules are broken down in the sense that their chains are reduced in length, which is manifested in particular by a more or less extensive breakdown of the viscosity compared with that of the products initially used. Moreover, the surfaces of the products treated by means of preliminary embrittlement or preliminary drying steps become keratinised.

EP-A 0 954 536 (equivalent to U.S. Pat. No. 6,320,043) discloses a process wherein a) a polysaccharide derivative is soaked or dissolved in an adequate quantity of a solvent like water, preferably 35 to 99 wt. %, particularly preferably 60 to 80 wt. %, based on the total weight, so that primary structures, such as fiber structures, which result from the polysaccharide starting material are largely removed, and subsequently b) the polysaccharide starting material is converted into the solid state in a dryer-pulveriser wherein the solvent contained in the soaked or dissolved polysaccharide derivative is converted into the vapour phase by means of a superheated vapour, and then c) optionally, in a subsequent drying step, is dried to the required moisture content in prior art units. The polysaccharide derivatives prepared by this process have a high bulk density and good flow properties. The particles thus produced have a shape factor of less than 5 and greater than/equal to 1, the majority (>50 wt. %) having a shape factor of less than/equal to 2 and the proportion of fine dust in the product being low. The shape factor means the ratio of the largest diameter to the smallest diameter of an (ideally ellipsoidal) body.

EP-A 1 127 895 (equivalent to U.S. Pat. No. 6,509,461) discloses a process for producing particulate water-soluble cellulose derivatives by a) forming a feed composition comprising 20 to 50 wt. % of a cellulose derivative and 50 to 80 wt. % of water, wherein the cellulose derivative is swollen or dissolved in the feed composition and b) contacting, in a high rotational speed impact mill, the feed composition with a heat exchange gas and carrier gas.

While the prior art processes represent useful advancements in the art, there is a long felt need and ever increasing demand for preparing polysaccharide particles with predictable dimensions.

One object of the present invention is to be able to control one or more critical dimensions of the polysaccharide derivative particles after dry-grinding. The optimum particle dimensions depend on the end-uses of the polysaccharide derivatives. Typically for pharmaceutical controlled release applications smaller particle sizes are required than for food or construction applications. Furthermore, a preferred object of the present invention is to be able to influence the bulk density and/or the dissolution rate of the polysaccharide particles after thy-grinding.

SUMMARY OF THE INVENTION

One aspect of the present invention is a process for producing a particulate polysaccharide derivative by dry-grinding a moist polysaccharide derivative, wherein one or more of the properties selected from the median diameter, the median length, the bulk density and the dissolution rate of the particles after dry-grinding is controlled by controlling the temperature of the polysaccharide derivative prior to dry-grinding.

Another aspect of the present invention is a process of controlling or adjusting one or more of the properties selected from median diameter, median length, bulk density and dissolution rate of polysaccharide derivative particles which comprises the steps of A) providing a moist polysaccharide,
B) controlling the temperature of the polysaccharide derivative,
C) dry-grinding the polysaccharide derivative of controlled temperature, and
D) establishing the correlation between i) the temperature of the polysaccharide derivative prior to dry-grinding and ii) one or more of the properties selected from median diameter, median length, bulk density and dissolution rate of the polysaccharide derivative particles after dry-grinding, and
E) adapting the temperature of the polysaccharide derivative prior to dry-grinding to the desired median diameter, median length, bulk density or dissolution rate of the particles after dry-grinding.

Surprisingly, it has been found that there is a correlation, typically a linear correlation, between i) the temperature of the polysaccharide derivative prior to dry-grinding and ii) one or more of the properties selected from the median diameter, the median length, the bulk density and the dissolution rate of polysaccharide derivative particles after dry-grinding.

It has surprisingly also been found that a higher temperature of the polysaccharide derivative prior to dry-grinding generally leads to a lower median diameter, a lower median length, a higher bulk density and a shorter dissolution rate of polysaccharide derivative particles after dry-grinding and vice versa. This finding does not only allow the production of polysaccharide derivatives with an optimal median particle diameter, an optimal median length, optimal bulk density and optimal dissolution rate for a given application but also optimizes the energy required for the dry-grinding process. Polysaccharide derivatives are typically purified after their production by washing with hot water. After washing the polysaccharide derivatives are typically cooled. The energy required for the dry-grinding process can be minimized if the temperature of the polysaccharide derivative prior to dry-grinding is optimized which is desired for a certain particle diameter. The present invention allows determination of the optimal temperature prior to dry-grinding to obtain polysaccharide derivative particles of a desired median diameter, desired median length, desired bulk density and desired dissolution rate.

DETAILED DESCRIPTION OF THE INVENTION

The present invention relates to a process for producing a particulate polysaccharide derivative by dry-grinding a moist polysaccharide derivative. Dry-grinding is generally described in the art as drying and grinding simultaneously in one process step with one unit operation, typically an impact mill or an air swept impact mill. Drying is typically accomplished with a combination of hot gas and mechanical energy. Hot air is most commonly used but also hot nitrogen gas can be used. The hot gas and the wet product stream are generally fed via separate inlets into the mill, typically hot gas from the bottom and wet product at a side entrance via a feed screw system connected to the mill.

The polysaccharide derivatives, preferably the cellulose derivatives, used in this process are generally soluble or at least soakable in solvents, preferably water. Preferred polysaccharide derivatives are polysaccharide ethers and polysaccharide esters, more preferably cellulose ethers and esters, most preferably water-soluble cellulose ethers. They can have one or more substituents, preferably of the types: hydroxyethyl, hydroxypropyl, hydroxybutyl, methyl, ethyl, propyl, dihydroxypropyl, carboxymethyl, sulfoethyl, hydrophobic long-chain branched and unbranched alkyl groups, hydrophobic long-chain branched and unbranched alkyl aryl groups or aryl alkyl groups, cationic groups, acetate, propionate, butyrate, lactate, nitrate or sulfate, of which some groups, such as, for example, hydroxyethyl, hydroxypropyl, hydroxybutyl, dihydroxypropyl and lactate, are capable of forming grafts. The substituents of the polysaccharides according to the invention are not limited to these groups. Typical polysaccharide derivatives are guar derivatives, starch derivatives, chitin or chitosan derivatives, and preferably cellulose derivatives, but the polysaccharide derivatives according to the invention are not limited to these.

Examples of cellulose derivatives are hydroxyethyl cellulose (HEC), hydroxypropyl cellulose (HPC), ethyl hydroxyethyl cellulose (EHEC), carboxymethyl cellulose, carboxymethyl hydroxyethyl cellulose (CMHEC), hydroxypropyl hydroxyethyl cellulose
(HPHEC), methyl cellulose (MC), methyl hydroxypropyl cellulose (MHPC), methyl hydroxyethyl cellulose (MHEC), carboxymethyl cellulose (CMC), hydrophobically modified hydroxyethyl cellulose (hmHEC), hydrophobically modified hydroxypropyl cellulose (hmHPC), hydrophobically modified ethyl hydroxyethyl cellulose (hmEHEC), hydrophobically modified carboxymethyl hydroxyethyl cellulose (hmCMHEC), hydrophobically modified hydroxypropyl hydroxyethyl cellulose (hmHPHEC), hydrophobically modified methyl cellulose (hmMC), hydrophobically modified methyl hydroxypropyl cellulose (hmMHPC), hydrophobically modified methyl hydroxyethyl cellulose (hmMHEC), hydrophobically modified carboxymethyl methyl cellulose (hmCMMC), sulfoethyl cellulose (SEC), hydroxyethyl sulfoethyl cellulose (HESEC), hydroxypropyl sulfoethyl cellulose (HPSEC), methyl hydroxyethyl sulfoethylcellulose (MHESEC), methyl hydroxypropyl sulfoethyl cellulose (MHPSEC), hydroxyethyl hydroxypropyl sulfoethyl cellulose (HEHPSEC), carboxymethyl sulfoethyl cellulose (CM-SEC), hydrophobically modified sulfoethyl cellulose (hmSEC), hydrophobically modified hydroxyethyl sulfoethyl cellulose (hmHESEC), hydrophobically modified hydroxypropyl sulfoethyl cellulose (hmHPSEC) or hydrophobically modified hydroxyethyl hydroxypropyl sulfoethyl cellulose (hmHEHPSEC). Particularly preferred cellulose derivatives are cellulose ethers having a thermal flocculation point in water, such as, for example, methyl cellulose, methyl hydroxyethyl cellulose, methyl hydroxypropyl cellulose and hydroxypropyl cellulose.

The production of polysaccharide derivatives, preferably polysaccharide ethers and polysaccharide esters is known in the art. Typically the production process involves activating the polysaccharide, such as cellulose, for example by treatment with an alkali metal hydroxide, reacting the thus treated polysaccharide with a derivatizing agent, such as an etherifying or esterifying agent, and washing the polysaccharide derivative to remove by-products. After the washing step the polysaccharide derivative generally has a moisture content of from 30 to 60 percent, typically from 45 to 55 percent, based on the total weight of the moist polysaccharide derivative. While the preferred washing liquor may depend on the specific type of polysaccharide derivative, preferred washing liquors generally are water, isopropanol, acetone, methylethylketone or brine. More preferred washing liquors generally are water or brine. Cellulose derivatives are generally washed at a temperature of from 20 to 120° C., preferably from 65 to 95° C. A solvent-moist, preferably a water-moist filter cake is obtained after washing and separating the polysaccharide derivative from the washing liquor. The moist polysaccharide derivative is usually obtained in the shape of moist granules, moist lumps and/or a moist paste.

According to one aspect of the present invention the polysaccharide derivative has been obtained by separating a polysaccharide derivative from a suspension thereof in a liquid, such as water, and is subsequently subjected to dry-grinding in a dry-grinding device. The suspension of particles in a liquid can originate from the production and washing the polysaccharide derivative, as described above. Separating a polysaccharide derivative from a suspension can be carried out in a known way, such as centrifugation.

According to another aspect of the present invention a dry polysaccharide derivative and a liquid, such as water, can be mixed in a compounder to a desired moisture content and the thus obtained moist polysaccharide derivative is subsequently subjected to dry-grinding in a dry-grinding device according to the process of the present invention. The compounder preferably allows thorough and intense mixing. Useful compounders are, for example, granulators, kneaders, extruders, presses, or roller mills, wherein the mixture of the polysaccharide derivative and liquid is homogenised by applying shear forces and compounding, such as a twin-screw compounder. Co-rotating as well as counter-rotating machines are suitable. So-called divided trough kneaders with two horizontally arranged agitator blades that engage deeply with one another and that perform a mutual stripping action, as in the case of twin-screw compounders are particularly suitable. Suitable single-shaft, continuous kneaders include the so-called Reflector® compounders, which are high performance mixers of modular construction, consisting of a multi-part, heatable and coolable mixing cylinder and a unilaterally mounted blade mixer (manufacturer: Lipp, Germany). Also suitable are so-called pinned cylinder extruders or Stiftconvert® extruders (manufacturer: Berstorff, Germany). The pins incorporated in the housing serve as abutments in order to prevent the kneaded material rotating together with the shaft. Kneader mixers with so-called double-blade sigma stirrers (manufacturer: Fima, Germany) in a horizontal assembly are particularly suitable. The blades operate at different speeds and their direction of rotation can be reversed. A stirred vessel with a vertically arranged mixer shaft is also suitable if suitable flow baffles are mounted on the vessel wall in order to prevent the kneaded mass rotating together with the stirrer shaft, and in this way an intensive mixing action is imparted to the kneaded material (manufacturer: Bayer AG). Also suitable are double-walled mixing vessels with a planetary stirrer and inline homogeniser.

Controlling the temperature of the polysaccharide derivative prior to dry-grinding is essential in the process of the present invention. According to a preferred embodiment of the present invention the median diameter, median length, bulk density and/or dissolution rate of the particles after dry-grinding are a) controlled and b) varied or adjusted by a) controlling and b) varying or adjusting the temperature of the polysaccharide derivative prior to dry-grinding.

According to another preferred embodiment of the present invention one or more of the properties selected from the median diameter, the median length, the bulk density and the dissolution rate of the particles after dry-grinding is adjusted to a first value by a first temperature of the polysaccharide derivative prior to dry-grinding and is adjusted to a second value by a second temperature.

A particularly preferred method of controlling one or more of the properties selected from the median diameter, the median length, the bulk density and the dissolution rate comprises the steps of
a) dry-grinding at least two samples, preferably at least three samples, more preferably at least 4 samples, most preferably at least 8 samples of a moist polysaccharide derivative, each sample having a different temperature prior to dry-grinding, and measuring one or more of the properties selected from median diameter, median length, bulk density and dissolution rate of the particles after dry-grinding of each of the samples,
b) determining the correlation between i) the temperature of the polysaccharide derivative prior to dry-grinding and ii) one or more of the properties selected from median diameter, median length, bulk density and dissolution rate, and
c) adapting the temperature of the polysaccharide derivative prior to dry-grinding to the desired median diameter, median length, bulk density or dissolution rate of the particles after dry-grinding.

Preferably the determined correlation between i) the temperature of the polysaccharide derivative prior to dry-grinding and ii) the median diameter and/or the median length is used as in-process control in a continuous dry-grinding process wherein the median diameter or median length is determined and utilized for setting and optionally adapting the temperature of the polysaccharide derivative prior to dry-grinding. Most preferably, the in-process control is carried out on-line.

The temperature of the polysaccharide derivative prior to dry-grinding is preferably controlled and optionally varied or adjusted in a range from 5 to 80° C., more preferably from 7 to 75° C., most preferably from 10 to 60° C. If a liquid such as water is added to the polysaccharide derivative prior to dry-grinding, the temperature of the polysaccharide derivative prior to dry-grinding is preferably controlled and optionally varied or adjusted by controlling and optionally varying or adjusting the temperature of the added liquid and/or the jacket temperature of the compounder. This can also be achieved without interrupting the dry-grinding process.

The moisture content of the polysaccharide derivative prior to dry-grinding is preferably 30 percent or more, more preferably 50 percent or more, and most preferably 55 percent or more prior to dry-grinding, based on the total weight of the moist polysaccharide derivative. The moisture content is preferably 98 percent or less, more preferably 80 percent or less, and most preferably 70 percent or less prior to dry-grinding, based on the total weight of the moist polysaccharide derivative. The moisture content can be determined by ASTM method D-2363-79 (reapproved 1989). At a desired moisture content, adapting the optimum temperature of the polysaccharide derivative prior to dry-grinding to the desired median diameter and/or median length of the particles after dry-grinding not only improves the control of the particle sizes after dry-grinding but also optimizes the energy required in the dry-grinding step. Uneconomic cooling and re-heating which may result in products of undesirably performance can be avoided by the process of the present invention. Moreover, the median diameter, median length, bulk density and/or dissolution rate of the particles can be controlled and optionally adjusted or varied without varying the parameters of the dry-grinding device or process, such as circumferential speed, air or gas flow through the mill (m3/h). When a change in median particle diameter, median length, bulk density and/or dissolution rate is desired or when the median particle diameter, median length, bulk density and/or dissolution rate does not meet the desired product specification and has to be adjusted, such change can be achieved without interrupting the dry-grinding process by controlling the temperature of the polysaccharide derivative prior to dry-grinding. This makes the process of the present invention very efficient.

Moreover, if desired in a specific process, wherein the dry-grinding is conducted in a rotational dry-grinding device, one or more of the properties selected from the median diameter, the median length, the bulk density and the dissolution rate of the particles after dry-grinding can be controlled and optionally varied or adjusted by controlling and optionally varying or adjusting the circumferential speed of the dry-grinding device, in addition to controlling the temperature of the polysaccharide derivative prior to dry-grinding. The circumferential speed of the dry-grinding device is preferably controlled and optionally varied or adjusted in a range from 35 to 140 m/s, more preferably from 45 to120 m/s, most preferably from 55 to 115 m/s.

After dry-grinding the polysaccharide derivative preferably has a median particle diameter DOP (50,3) of at least 20 micrometers, more preferably at least 30 micrometers. The polysaccharide derivative preferably has a median particle diameter DOP (50,3) of up to 250 micrometers, more preferably up to 150 micrometers, and most preferably up to 100 micrometers. The diameter of the particles is called DOP. The DOP is preferably measured by a high speed image analysis system which combines particle size and shape analysis. This specific image analysis method is described in: W. Witt, U. Köhler, J. List, Current Limits of Particle Size and Shape Analysis with High Speed Image Analysis, PARTEC 2007.

The median particle diameter DOP (50,3) is defined as follows: All particle size distributions, e.g. the DOP can be displayed and applied as number (0), length (1), area (2) or volume (3) distribution. The volume distribution of the DOP is calculated as cumulative distribution $Q_3$. The volume distribution within the particle diameter value DOP 50,3 is designated by the number 3 after the comma. The designation 50, reflecting the median value, stands for 50% of the diameter of particle distribution being smaller than the given value in μm and 50% being larger. The 50% DOP value is calculated by the image analyzer software. A high speed image analysis system is commercially available from Sympatec GmbH, Clausthal Zellerfeld, Germany as dynamic image analysis (DIA) system QICPIC™. The system analyses the shape of the particles and takes potential curliness of the particles into account. It provides a more accurate measurement of true particle sizes than other methods. The dynamic image analysis (DIA) system QICPIC™ is described in more detail by Witt, W., Köhler, U., List, J.: Direct Imaging of very fast Particles Opens the Application of Powerful (dry) Dispersion for Size and Shape Characterization, PARTEC 2004, Nuremberg, Germany.

After dry-grinding the polysaccharide derivative preferably has a median diameter of a Circle of Equal Projection Area (EQPC 50,3) of at least 30 micrometers, more preferably at least 50 micrometers, and most preferably at least 70 micrometers. The polysaccharide derivative preferably has a median EQPC of up to 1000 micrometers, more preferably up to 750 micrometers, and most preferably up to 500 micrometers.

The EQPC of the particle is defined as the diameter of a circle that has the same area as the projection area of the particle. The EQPC is preferably measured by a high speed image analysis system which combines particle size and shape analysis. This specific image analysis method is described in more detail by Witt, W., Köhler, U., List, J.: Direct Imaging of very fast Particles Opens the Application of Powerful (dry) Dispersion for Size and Shape Characterization, PARTEC 2004, Nuremberg, Germany.

The EQPC (50,3) is the median diameter of a Circle of Equal Projection Area and is defined as follows: All particle size distributions, e.g. the EQPC can be displayed and applied as number (0), length (1), area (2) or volume (3) distribution. The volume distribution of the EQPC is calculated as cumulative distribution $Q_3$. The volume distribution within the diameter of a Circle of Equal Projection Area value EQPC 50,3 is designated by the number 3 after the comma. The designation 50, reflecting the median value, stands for 50% of the EQPC of particle distribution being smaller than the given value in μm and 50% being larger. The 50% EQPC value is calculated by the image analyzer software.

After dry-grinding the polysaccharide derivative preferably has a median particle length of at least 50 micrometers, more preferably at least 75 micrometers, and most preferably at least 100 micrometers. The polysaccharide derivative preferably has a median particle length of up to 2000 micrometers, more preferably up to 1500 micrometers, and most preferably up to 1000 micrometers. The length of the particle is defined as the longest direct distance between opposite ends of the particle inside the particle contour, designated as LOP (Length of Particle). "Direct" means without loops or branches. The LOP is preferably measured by a high speed image analysis system which combines particle size and shape analysis. This specific image analysis method is described in: W. Witt, U. Köhler, J. List, Current Limits of Particle Size and Shape Analysis with High Speed Image Analysis, PARTEC 2007.

The LOP (50,3) is the median length and is defined as follows:

All particle size distributions, e.g. the LOP can be displayed and applied as number (0), length (1), area (2) or volume (3) distribution. Preferably the volume distribution of the LOP is calculated as cumulative distribution $Q_3$. The volume distribution within the particle length value LOP 50,3 is designated by the number 3 after the comma. The designation 50, reflecting the median value, stands for 50% of the length of particle distribution being smaller than the given value in μm and 50% being larger. The 50% LOP value is calculated by the image analyzer software. A high speed image analysis system is commercially available from Sympatec GmbH, Clausthal Zellerfeld, Germany as dynamic image analysis (DIA) system QICPIC™, as indicated above.

After determination of the appropriate temperature for a desired median diameter, median length, bulk density and/or dissolution time of the particles after dry-grinding, the appropriate temperature is compared with the actual temperature of the polysaccharide derivative. Depending on the result, the polysaccharide derivative is left unchanged or its temperature is adjusted by cooling or heating and/or the polysaccharide derivative is contacted with a solvent to achieve the desired temperature of the polysaccharide derivative. Typically the polysaccharide derivative is contacted with a solvent that dissolves, partially dissolves or soaks the polysaccharide derivative. The polysaccharide derivative is generally contacted with a solvent at a temperature of from 0 to 75° C., preferably from 5 to 60° C. The solvent can be used for controlling the temperature of the polysaccharide derivative; alternatively the temperature of the polysaccharide derivative can be controlled by directly cooling or heating the polysaccharide derivative.

Suitable solvents for the soaking or dissolving are solvents whose molecules have polar groups which preferably contain the hetero atoms nitrogen, sulfur or oxygen. However, hydrocarbons and halogenated hydrocarbons may also be used. Preferred solvents are water, alcohols such as methanol, ethanol or isopropanol or esters such as ethyl acetate and butyl acetate. The particularly preferred solvent is water. The term "solvent" as used herein also includes mixtures of solvents.

The moist polysaccharide derivative which is usually in the shape of moist granules, moist lumps and/or a moist paste can be conducted in a known dry-grinding device, for example in a gas-swept impact mill, preferably an air-swept impact mill, wherein the polysaccharide derivative is subjected to an impacting and/or shearing stress. Suitable mills are, for example, hammer mills, screen-type mills, pin mills, disk mills, jet mills, or preferably classifier mills. Superheated vapor of a solvent, such as superheated steam, or a steam/inert gas mixture or a steam/air mixture can be used as heat-transfer gas and transport gas, as described in more detail in European Patent Applications EP 0 954 536 A1 and EP 1 127 910 A1. In the dry-grinding process of the present invention the moisture content of the polysaccharide derivative after dry-grinding is typically reduced to 1 to 20 percent, preferably 1 to 10 percent, more preferably 1 to 5 percent, based on the total weight of the moist polysaccharide derivative.

The present invention is further illustrated by the following Examples which are not to be construed to limit the scope of the invention. Unless otherwise indicated, all parts and percentages are by weight.

EXAMPLE 1-8

A commercially available continuous compounder with heating and cooling jacket was used to add water to dry METHOCEL™ K100M cellulose ether, commercially available from The Dow Chemical Company. The compounder jacket was supplied with a fluid of −10 ° C. to 70 ° C.

METHOCEL™ K100M cellulose ether having a degree of substitution of methoxyl groups of 19-24% and of hydroxypropoxyl groups of 7-12% , a viscosity of 100,000 mPa.s, measured as a 2 percent aqueous solution at 20° C., and a moisture level of less than 5% was fed continuously at a feed rate of 30 kg/h into the compounder. Water of a temperature of 25° C. to 60° C. was continuously added at rates of 45 kg/h to the compounder resulting in a moisture level of about 60%. The wet product was transported continuously via a transport belt into a mill feed unit (Altenburger Maschinen Jaeckering GmbH, Hamm, Germany). The bottom blades of the vessel agitator pressed the paste into a single augur screw mounted at the bottom of the vessel. The wet product was forced through a perforated plate directly into the side of an Ultrarotor II "S" impact mill (Altenburger Maschinen Jaeckering GmbH, Hamm, Germany) between the first and second grinding stage. The mill was equipped with seven grinding stages. The bottom three grinding stages were equipped with standard grinding bars. Turbo-bars were installed in the top four grinding stages. A co-rotating finger sifter wheel with twelve blades was installed on the top of the 7th grinding stage. The interior of mill jacket had the standard Altenburger corrugated stationary grinding plates.

The rotor of the impact mill was operated at a circumferential speed of 114 m/s. A hot gas stream, i.e. nitrogen was fed with 1000 m$^3$/h into the bottom of the mill. A cyclone was used to separate the dried product from the nitrogen. The final product moisture was smaller than 2% by weight.

particle (LOP) is defined as the longest direct distance between opposite ends of the particle inside the particle contour. The EQPC is calculated as a diameter of a circle that has the same area as the projection area of the particle.

The dissolution rate of the product was determined by measuring the time for 50% and 80% viscosity build-up according to the following procedure:

A 5% by weight dispersion of cellulose ether in isopropanol is generated and transferred into a rheometer system (Haake RS 600, cylinder system with agitator geometry Z 40-DIN). The measuring cylinder system contains a $KH_2PO_4$/NaOH buffer solution of pH 5.9 at 20 deg C. The concentration of cellulose ether in the buffer solution mixture is 1.5% by weight. The agitator of the rheometer cylinder system is operated at 388 rpm for 900 seconds at 20 deg C. The torque is measured over time representing viscosity build-up of the cellulose ether during hydration. The times required for 50% and 80% of final torque build-up are taken as indicator for the dissolution rate respectively hydration time of the cellulose ether in the buffer solution. When the cellulose derivative is dissolved in the aqueous buffer solution, the viscosity of the 1.5 percent aqueous buffer solution of the cellulose derivative increases until an equilibrium is achieved. The measurement how fast the 50% and 80% of the viscosity at equilibrium is built up is a measure for the dissolution speed of the cellulose derivative.

Bulk density as used herein is defined as the ratio of apparent volume to mass of the material taken, called untapped bulk density, and also the ratio of tapped volume to mass of material taken, called tapped bulk density. An useful procedure for measuring these bulk densities is described in United States Pharmacopeia 24, Test 616 "Bulk Density and Tapped Density," United States Pharmacopeia Convention, Inc., Rockville, Md., 1999. The bulk densities of the produced cellulose ether particles were measured off-line.

TABLE 1

| Example | Moisture (%)* | Temperature (° C.)* | DOP 50.3 (μm)** | LOP 50.3 (μm)** | EQPC 50.3 (μm)** | Time for 50% Viscosity Build-up | Time for 80% Viscosity Build-up | Untapped Bulk Density (g/l) | Tapped Bulk Density (g/l) |
|---|---|---|---|---|---|---|---|---|---|
| 1 | 60.7 | 25.5 | 44.9 | 286.4 | 110.8 | 71.9 | 134.8 | 215 | 332 |
| 2 | 60.5 | 29.5 | 45.1 | 286.2 | 110.6 | 74.3 | 139.6 | 200 | 313 |
| 3 | 59.0 | 35.0 | 43.4 | 286.0 | 105.2 | 71.3 | 134.5 | 208 | 330 |
| 4 | 59.0 | 40.0 | 44.1 | 272.0 | 100.9 | 68.0 | 126.8 | 235 | 361 |
| 5 | 59.8 | 45.5 | 42.0 | 257.0 | 91.8 | 64.8 | 121.4 | 255 | 389 |
| 6 | 59.9 | 50.0 | 41.4 | 236.7 | 84.7 | 60.4 | 115.7 | 265 | 403 |
| 7 | 60.1 | 55.1 | 40.8 | 229.3 | 82.3 | 58.8 | 113.4 | 268 | 405 |
| 8 | 59.8 | 60.2 | 39.4 | 229.3 | 79.8 | 54.0 | 105.7 | 264 | 408 |

*prior to dry-grinding
**after dry-grinding

The diameter, length and diameter of a Circle of Equal Projection Area of the particles, called DOP; LOP; and EQPC and the median particle diameter, median particle length, and median diameter of a Circle of Equal Projection Area calculated based on volume distribution, called DOP 50,3; LOP 50,3; and EQPC 50,3 were measured with high speed image analyzer (high speed image analyzer sensor QICPIC, Sympatec, Germany, with dry disperser RODOS/L with an inner diameter of 4 mm and dry feeder VIBRI/L and divide Software WINDOX5, Vers. 5.3.0 and M7 lens). The QICPIC WINDOX software calculates the DOP, LOP and EQPC in the following way: The calculation of DOP (Diameter of Particle) is applied to those particles only that are completely within the image frame by dividing the projection area by the sum of all lengths of the branches of the fibre. The length of a The results in Table 1 illustrate the correlations between the temperature of the particulate polysaccharide derivative prior to dry-grinding, the DOP 50,3, the LOP 50,3, the dissolution rate measured as time for 50% respectively 80% of viscosity build-up and the bulk density of the particulate polysaccharide derivative after dry-grinding. The measurement of the DOP 50,3 and LOP 50,3 can be done on-line and is a rapid in-process control for indirectly determining the temperature of the polysaccharide derivative prior to dry-grinding, the dissolution rate as well as the bulk density after dry-grinding. This allows adapting the temperature to the desired median diameter, median length and to the desired dissolution rate as well as bulk density of the particles after dry-grinding.

The median particle diameter DOP 50,3 shows a correlation to the temperature according to the formula:

$$\text{DOP } 50,3 = +49.519 - 0.1617*[^\circ \text{ C. temperature}],$$

with an $R^2$ of 0.9311 and a negative slope, i.e. the DOP 50,3 decreases with increasing temperature.

The median particle length LOP 50,3 shows a correlation to the temperature according to the formula:

$$\text{LOP } 50,3 = +346.07 - 2.0125*[^\circ \text{ C. temperature}],$$

with an $R^2$ of 0.9236 and a negative slope, i.e. the LOP 50,3 decreases with increasing temperature.

The EQPC 50,3 shows a correlation to the temperature according to the formula:

$$\text{EQPC } 50,3 = +139.31 - 1.0222 \times *[^\circ \text{ C. temperature}],$$

with an $R^2$ of 0.9699 and a negative slope, i.e. the EQPC 50,3 decreases with increasing temperature.

The untapped bulk density shows a correlation to the temperature according to the formula:

$$\text{Untapped bulk density} = +149.71 + 2.0904*[^\circ \text{ C. temperature}],$$

with an $R^2$ of 0.8433 and a positive slope, i.e. the untapped bulk density increases with increasing temperature.

The tapped bulk density shows a correlation to the temperature according to the formula:

$$\text{Tapped bulk density} = +229.85 + 3.293*[^\circ \text{ C. temperature}],$$

with an $R^2$ of 0.889 and a positive slope.

The dissolution rate measured as time for 50% viscosity build-up shows a correlation to the temperature according to the formula:

$$\text{Time for 50\% viscosity build-up} = +89.686 - 0.5693*[^\circ \text{ C. temperature}],$$

with an $R^2$ of 0.944 and a negative slope, i.e. the Time for 50% viscosity build-up decreases with increasing temperature.

The dissolution rate measured as time for 80% viscosity build-up shows a correlation to the temperature according to the formula:

$$\text{Time for 80\% viscosity build-up} = +164.32 - 0.9471*[^\circ \text{ C. temperature}],$$

with an $R^2$ of 0.944 and a negative slope, i.e. the Time for 80% viscosity build-up decreases with increasing temperature.

The median particle diameter DOP 50,3 and the median particle length LOP 50,3 show that with increasing temperature of the polysaccharide derivative prior to dry-grinding the DOP 50,3 as well as the LOP 50,3 are reduced. The time for 50% respectively 80% viscosity build-up, which is a measure for the dissolution speed of the polysaccharide derivative particles, decreases with the decrease of the median particle diameter and length as well, i.e. this dissolution speed of the particles after dry-grinding can be controlled by controlling the temperature of the polysaccharide derivative prior to dry-grinding.

EXAMPLE 9-16

The procedure of Examples 1-8 was repeated, except that the rotor of the impact mill was operated at a circumferential speed of 58 m/s.

The results are listed in Table 2.

TABLE 2

| Example | Moisture (%)* | Temperature (° C.)* | DOP 50,3 (μm)** | LOP 50,3 (μm)** | EQPC 50,3 (μm)** | Time for 50% Viscosity Build-up | Time for 80% Viscosity Build-up | Untapped Bulk Density (g/l) | Tapped Bulk Density (g/l) |
|---|---|---|---|---|---|---|---|---|---|
| 9  | 60.0 | 25.5 | 76.8 | 1111.8 | 405.8 | 557 | 926 | 195 | 263 |
| 10 | 60.6 | 30.0 | 72.3 | 1098.2 | 395.9 | 565 | 953 | 188 | 255 |
| 11 | 60.6 | 35.5 | 76.0 | 1056.8 | 397.5 | 506 | 863 | 197 | 260 |
| 12 | 60.3 | 40.0 | 70.0 | 930.3  | 350.9 | 486 | 833 | 218 | 293 |
| 13 | 60.3 | 44.5 | 73.3 | 881.2  | 346.9 | 517 | 865 | 223 | 304 |
| 14 | 60.3 | 51.0 | 66.5 | 742.8  | 291.9 | 354 | 620 | 233 | 319 |
| 15 | 59.2 | 55.1 | 68.4 | 735.6  | 292.8 | 371 | 632 | 234 | 318 |
| 16 | 59.7 | 60.0 | 64.4 | 616.5  | 242.1 | 285 | 505 | 241 | 335 |

*prior to dry-grinding
**after dry-grinding

The results in Table 2 illustrate the correlations between the temperature of the particulate polysaccharide derivative prior to dry-grinding, the DOP 50,3, the LOP 50,3, the dissolution rate measured as time for 50% respectively 80% of viscosity build-up and the bulk density of the particulate polysaccharide derivative after dry-grinding with a air swept impact mill at 58 m/s.

The median particle diameter DOP 50,3 shows a correlation to the temperature according to the formula:

$$\text{DOP } 50,3 = +84.486 - 0.3165*[^\circ \text{ C. temperature}],$$

with an $R^2$ of 0.7569 and a negative slope, i.e. the DOP 50,3 decreases with increasing temperature.

The median particle length LOP 50,3 shows a correlation to the temperature according to the formula:

$$\text{LOP } 50,3 = +1538.4 - 15.029* [^\circ \text{ C. temperature}],$$

with an $R^2$ of 0.972 and a negative slope, i.e. the LOP 50,3 decreases with increasing temperature.

$$\text{EQPC} = +540.79 - 4.7037* [^\circ \text{ C. temperature}],$$

with an $R^2$ of 0.9326 and a negative slope, i.e. the EQPC decreases with increasing temperature.

The untapped bulk density shows a correlation to the temperature according to the formula:

$$\text{Untapped bulk density} = +148.56 + 1.5862*[^\circ \text{ C. temperature}],$$

with an $R^2$ of 0.9235 and a positive slope, i.e. the untapped bulk density increases with increasing temperature.

The tapped bulk density shows a correlation to the temperature according to the formula:

$$\text{Tapped bulk density} = +191.1 + 2.4011*[^\circ \text{ C. temperature}],$$

with an $R^2$ of 0.92 and a positive slope.

The dissolution rate measured as time for 50% viscosity build-up shows a correlation to the temperature according to the formula:

Time for 50% viscosity build-up=795.91−7.9809*[° C. temperature], with an $R^2$ of 0.872 and a negative slope, i.e. the time for 50% viscosity build-up decreases with increasing temperature.

The dissolution rate measured as time for 80% viscosity build-up shows a correlation to the temperature according to the formula:

Time for 80% viscosity build-up=+1316.5−12.691*[° C. temperature], with an $R^2$ of 0.8779 and a negative slope, i.e. the time for 80% viscosity build-up decreases with increasing temperature.

What is claimed is:

1. A process for producing a particulate polysaccharide derivative by dry-grinding a moist polysaccharide derivative, wherein one or more of the properties selected from median diameter, median length, bulk density and dissolution rate of the particles after dry-grinding is controlled by controlling the temperature of the polysaccharide derivative prior to dry-grinding, which process comprises the steps of
   a) dry-grinding, at least two samples of a moist polysaccharide derivative, each sample having a different temperature in a range of 5 to 80° C. prior to dry-grinding, and measuring one or more of the properties selected from median diameter, median length, bulk density and dissolution rate of the particles after dry-grinding of each of the samples,
   b) determining the correlation between i) the temperature of the polysaccharide derivative prior to dry-grinding and ii) one or more of the properties selected from median diameter, median length, bulk density and dissolution rate, and
   c) adapting the temperature of the polysaccharide derivative prior to dry-grinding to the desired median diameter, median length, bulk density or dissolution rate of the particles after dry-grinding.

2. A process of controlling or adjusting one or more of the properties selected from median diameter, median length, bulk density and dissolution rate of polysaccharide derivative particles comprising the steps of
   A) providing a moist polysaccharide derivative,
   B) controlling the temperature of the polysaccharide derivative,
   C) dry-grinding at least two samples of the moist polysaccharide derivative, each sample having a different temperature in a range of 5 to 80° C. prior to dry-grinding, and measuring one or more of the properties selected from median diameter, median length, bulk density and dissolution rate of the particles after dry-grinding of each of the samples, and
   D) establishing the correlation between i) the temperature of the polysaccharide derivative prior to dry-grinding and ii) one or more of the properties selected from median diameter, median length, bulk density and dissolution rate of the polysaccharide derivative particles after dry-grinding, and
   E) adapting the temperature of the polysaccharide derivative prior to dry-grinding to the desired median diameter, median length, bulk density or dissolution rate of the particles after dry-grinding.

3. The process of claim 2 wherein the determined correlation between i) the temperature of the polysaccharide derivative prior to dry-grinding and ii) the median diameter or the median length is used as in-process control in a continuous dry-grinding process wherein the median diameter or median length is determined and utilized for setting and optionally adapting the temperature of the polysaccharide derivative prior to dry-grinding.

4. The process of claim 3 wherein the in-process controls is carried out on-line.

5. The process of claim 1 wherein the polysaccharide derivative has been obtained by separating a polysaccharide derivative from a suspension thereof in a liquid and is subsequently subjected to dry-grinding in a dry-grinding device.

6. The process of claim 1 wherein a dry polysaccharide derivative and a liquid are mixed in a compounder and the thus obtained moist polysaccharide derivative is subsequently subjected to dry-grinding in a dry-grinding device.

7. The process of claim 1 wherein the temperature of the polysaccharide derivative particles prior to dry-grinding is controlled in a range of 7 to 75° C.

8. The process of claim 1 wherein the cellulose derivative is a cellulose ether.

9. The process of claim 1 wherein the length or the median diameter or both of the particles is or are determined by high speed image analysis.

10. The process of claim 1 wherein the dry-grinding step is carried out in an air-swept impact mill.

11. The process of claim 2 wherein the polysaccharide derivative has been obtained by separating a polysaccharide derivative from a suspension thereof in a liquid and is subsequently subjected to dry-grinding in a dry-grinding device.

12. The process of claim 2 wherein a dry polysaccharide derivative and a liquid are mixed in a compounder and the thus obtained moist polysaccharide derivative is subsequently subjected to dry-grinding in a dry-grinding device.

13. The process of claim 2 wherein the temperature of the polysaccharide derivative particles prior to dry-grinding is controlled in a range of 7 to 75° C.

14. The process of claim 2 wherein the cellulose derivative is a cellulose ether.

15. The process of claim 2 wherein the length or the median diameter or both of the particles is or are determined by high speed image analysis.

16. The process of claim 2 wherein the dry-grinding step is carried out in an air-swept impact mill.

* * * * *